(No Model.)
J. A. WOODMAN & B. H. A. SIEFKEN.
Ore Separator.
No. 237,226. Patented Feb. 1, 1881.
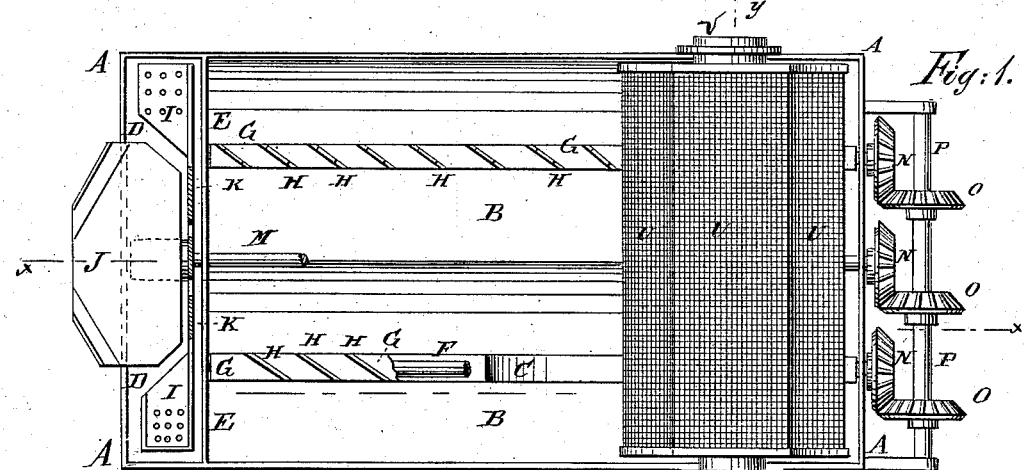
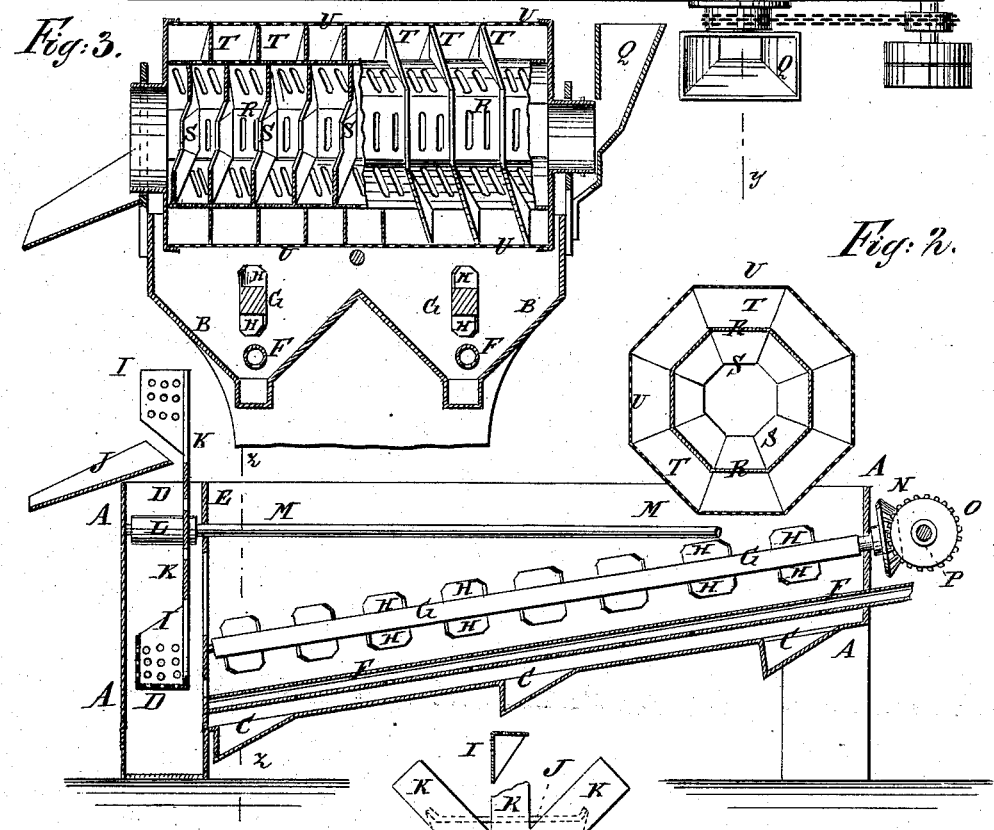
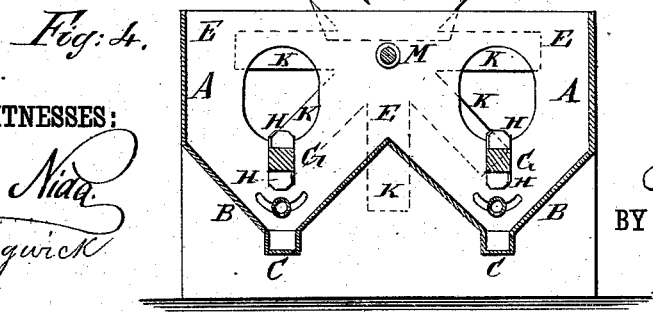
WITNESSES:
Chas. Nidd
C. Sedgwick
INVENTOR:
J. A. Woodman
B. H. A. Siefken
BY Munn & Co.
ATTORNEYS.

UNITED STATES PATENT OFFICE.

JAMES A. WOODMAN AND BURCHARD H. A. SIEFKEN, OF OMAHA, NEBRASKA.

ORE-SEPARATOR.

SPECIFICATION forming part of Letters Patent No. 237,226, dated February 1, 1881.

Application filed July 3, 1880. (No model.)

*To all whom it may concern:*

Be it known that we, JAMES ARTHUR WOODMAN and BURCHARD HENRY ADOLPH SIEFKEN, of Omaha, in the county of Douglas and State of Nebraska, have invented a new and useful Improvement in Ore-Separators, of which the following is a specification.

Figure 1 is a plan view of the improvement. Fig. 2 is a sectional side elevation taken through the line $x\ x$, Fig. 1. Fig. 3 is a sectional end elevation taken through the line $y\ y$, Fig. 1. Fig. 4 is a sectional end elevation taken through the line $z\ z$, Fig. 2.

Similar letters of reference indicate corresponding parts.

The object of this invention is to furnish ore-separators for use in placer-mining where water is scarce, and which shall be simple in construction, convenient in use, and effective in operation.

The invention consists in constructing an ore-separator of a box having angular troughs or channels provided with pockets in its inclined bottom and a settling-chamber at its lower end, the perforated pipes, the agitator-shafts having inclined wings, the revolving screen-buckets and their shaft, and the polygonal screen, all constructed and operating as will be hereinafter fully described.

A represents a box of convenient length and breadth, which is made with an inclined bottom and horizontal top, and which is designed to be mounted upon wheels, so that it can be conveniently moved from place to place. The bottom of the box A is so made as to form one, two, or more angular channels or troughs, B, in the bottom of which are formed pockets C, to receive quicksilver to separate and hold the gold. At the lower end of the box A is formed a settling-chamber, D, by a cross-partition, E. In the trough B are placed pipes F, having small holes in their lower sides, through which small jets of water are projected downward and forward into the sand and gravel in the lower parts of the said troughs to keep the quicksilver clean by forcing the sand and gravel to the apertures in the partition E. Water is forced into the pipes F from some suitable reservoir by a pump, (which is not shown in the drawings, as it forms no part of our invention.) The sand, gravel, and water are agitated, and the sand and gravel are fed down to the lower end of the box A by shafts G, having inclined wings H attached to them. At the lower end of the box A the sand and gravel pass through holes in the partition E into the settling-chamber D, whence they are removed by the buckets I, which have holes in their bottoms for the escape of the water. The sand and gravel are discharged from the buckets I into the discharge-spout J. The buckets I are attached to the outer ends of radial arms K, the inner ends of which are attached to a hub, L, secured to the shaft M. The shaft M and the stirrer-shafts G are connected, by beveled gear-wheels N O, with a shaft, P, which is driven by the steam-engine or other suitable power that drives the pump, and which is not shown in the drawings. The sand and gravel containing the gold are designed to be fed, by a self-feeding apparatus, into a hopper, Q, from which they pass into the screen. The screen is formed of an inner polygonal cylinder, R, having slots formed through its sides, having spiral flanges S attached to its inner surface, and spiral flanges T attached to its outer surface. The spiral flanges T have a wire-cloth cylinder, U, attached to their outer edges, and are so formed that the wire-cloth cylinder U may be in polygonal form, and may have its sides parallel with the sides of the cylinder R. The inner flanges, S, are so formed as to carry the sand and gravel forward, the finer parts passing through the slots of the cylinder R, and the coarser parts escaping through a pipe, V, at the tail of the screen. The outer spiral flanges, T, carry the fine sand and gravel toward the tail of the screen, the finer parts escaping through the wire-cloth U, and the coarser parts passing at the tail of the screen into the central part of the said screen, to pass out through the pipe V. The polygonal form of the screen R S T U causes the sand and gravel to be agitated as they pass from one side to the other of the screen, and thus make the said screen more effective. The screen R S T U is revolved from the shaft P by an endless chain and chain-wheels, or other suitable means.

The box A should be provided with a discharge-pipe, so that if more water enters the said box than is needed the surplus water can overflow into settling-tanks to be again used.

Having thus described our invention, what we claim as new, and desire to secure by Letters Patent, is—

1. An ore-separator constructed substantially as herein shown and described, consisting of the box A, having angular channels B, provided with pockets C in its inclined bottom, and a settling-chamber, D, at its lower end, the revolving screen-buckets I K, the shaft M, the perforated pipes F, the shafts G, having inclined wings H, and the polygonal screen R S T U, as set forth.

2. The box A, having the troughs B, with pockets C, and a settling-chamber, D, in combination with the pipes F, having holes on the lower side, the revolving stirrers, and the separator-wheel, as and for the purpose specified.

JAMES ARTHUR WOODMAN.
BURCHARD HENRY ADOLPH SIEFKEN.

Witnesses:
JAMES L. LOVETT,
FRANK MURPHY.